UNITED STATES PATENT OFFICE.

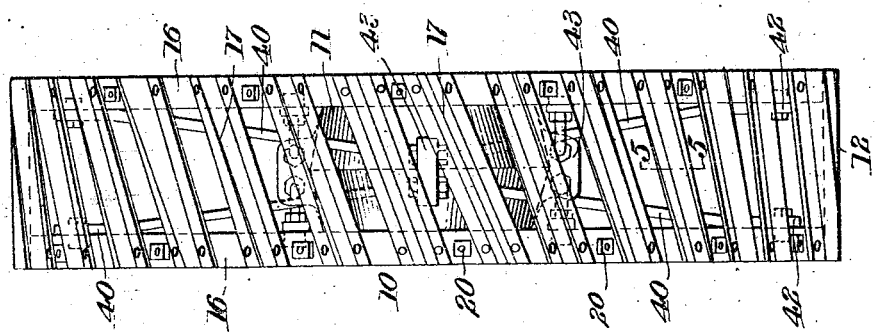

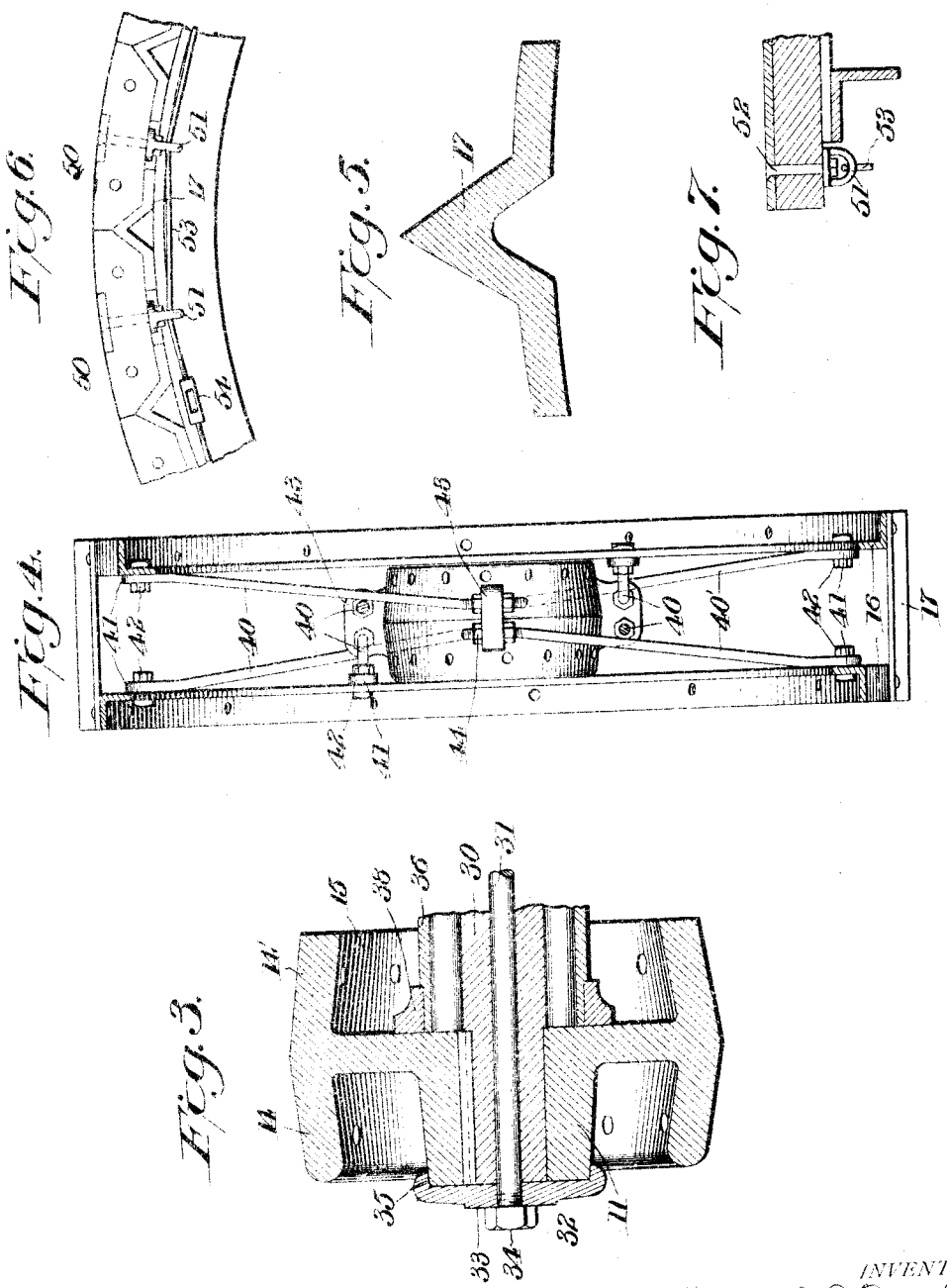

RUDOLPH B. MORTON, OF CLEVELAND, OHIO.

TRACTION-WHEEL.

1,195,066.   Specification of Letters Patent.   Patented Aug. 15, 1916.

Application filed May 1, 1912. Serial No. 694,377.

*To all whom it may concern:*

Be it known that I, RUDOLPH B. MORTON, a citizen of the United States, residing at Cleveland, in the county of Cuyahoga and State of Ohio, have invented new and useful Improvements in Traction-Wheels, of which the following is a specification.

This invention relates to certain new and useful improvements in traction wheels.

One of the objects of the invention is to provide a wheel of the character mentioned which will be simple in construction, light in weight and adapted to withstand the severe strains to which traction wheels are subjected.

A further object is to provide improved means for transmitting the pulling strains of the driving power from the hub of the wheel to the rim thereof in a central line and in such manner as to relieve the carrying spokes from such strains, and to thereby prevent distortion of the wheel.

A further object is to provide improved self-cleaning tractors.

A further object is to provide an improved hub of simple construction, and means for effectively connecting the same to an axle.

A further object is to provide improved means for preventing skidding of the wheel.

The invention will be hereinafter fully set forth and particularly pointed out in the claims.

In the accompanying drawings: Figure 1 is a side elevation of my improved traction wheel. Fig. 2 is an edge view thereof. Fig. 3 is a cross section of the hub illustrating the connection with an axle of a traction engine. Fig. 4 is a sectional view on the line 4—4 Fig. 1, with the spokes removed. Fig. 5 is a sectional view on the line 5—5, Fig 2. Figs. 6 and 7 are views illustrating protector blocks and the means for securing them in position on the wheel.

Referring to the drawing, 10 designates my improved wheel as an entirety, the same being made up of the hub 11, the rim 12, and the load carrying spokes 13 connecting the hub and the rim. The hub is provided at its ends with the annular flanges 14, 14', one of which forms an annular chamber or recess 15. The rim of the wheel is formed of two spaced apart annular members 16 formed of angle iron, and connected by means of spirally arranged cleats 17, said cleats being secured at their ends to the lateral or tread portions of the angle irons 16. Said cleats are provided with V-shaped tractor portions. By providing the spaced apart angle irons 16 and connecting them by means of spaced apart cleats 17 a structure is obtained which will not skid.

The load carrying spokes comprise rods passed through suitable openings in the horizontal or tread portions of the angle irons 16 and coinciding openings in the flanges 14, 14'. The outer ends of said rods are headed as indicated at 20, and bear against the periphery of the tread portions of each angle iron 16, the inner ends of said rods being threaded to receive nuts 21, 22, located on opposite sides of the flanges 14, 14', the nuts 21 serving to adjust the length of said spokes to permit truing of the wheel, and the nuts 22 serving to lock the spokes when so adjusted. Thus the spokes are arranged in two sets. The spokes of the set that pass through flange 14 also pass through the angle iron on the corresponding side of the rim, and the spokes that pass through the flanges 14' connect said flanges with the other ring of the rim, so that the plane of drive through the wheel is central.

The hub 11 is keyed or otherwise secured to a tubular axle 30 through which is passed a rod 31, said rod being also passed through a securing cap 32 provided with a flat bearing face 33 for a securing nut 34 working on said rod. The cap 32 is provided with a flange 35 which snugly fits over the outer end of the hub 11 so that said cap will rotate with said hub. The axle 30 is rotatably mounted in a sleeve 36 and a sand band, or other similar protecting device 38, is secured to said sleeve and located within the annular chamber 15.

In order to take the pulling strain of the load off of the spokes 13 and to prevent distortion of the wheel, I provide suitable pulling rods 40. These rods are arranged tangentially of the hub 11, and are each provided at one end with an eye 41 to receive bolts 42 secured to the vertical flanges of the angle irons 16, the other end of each pulling rod being threaded and passed through perforated lugs 43 secured to the rim of the hub 11. The tension on said pulling rods is regulated by means of nuts 44. It will be noted in this connection that I have illustrated pulling rods 40 arranged to take up the pulling strains when the wheel rotates in one direction, and similar rods 40' arranged to take up said strains when the wheel rotates in the other direction although it is obvious that either set may be omitted. The pulling rods of each set extend alternately from the hub 11 to the opposite vertical flanges of the annular angle iron members 16, thereby transmitting the strains from the rim toward the middle of the hub. Distortion of the wheel under great strains is thereby prevented.

In many localities the police regulations and highway laws prohibit motor vehicles from passing over streets and roads when the traction wheels of such vehicles are provided with cleats or similar devices projecting from the periphery of the wheel to secure a traction engagement with the ground. In order to meet this condition I provide filler blocks 50 preferably of wood or similar relatively soft material beveled to fit between the V-shaped portions of adjacent cleats 17, said blocks being each provided with eyes 51 carried by spaced apart bolts 52, suitable cables 53 being threaded through the eyes. The ends of each cable 53 are connected by a turnbuckle 54, by means of which the cable may be drawn taut to retain the blocks 50 in position. It will be noted in this connection that when the said blocks are secured in position on the periphery of the wheel V-shaped portions of the cleats 17 are below the tread surfaces of said blocks. Thus the roads are protected from injury when said blocks are employed, and by reason of the diagonal arrangement of the cleats 17 and blocks 50 the vehicle will rotate smoothly and with little or no shock or vibration on the vehicle or the mechanism carried thereby. It will also be observed that my improved blocks may be readily applied to a traction wheel or removed therefrom at will. It will be noted that by employing the spiral arrangement of the cleats 17 instead of arranging the latter parallel with the axis of the wheel, the latter will roll smoothly on each successive cleat as it strikes the ground. If the ground is smooth and hard, the radial distance from the center of the hub to the point of contact of the successive cleats will be the same at all times also when wheels are driven in the direction of most frequent motion, the cleats tend to draw the bottoms of the wheels together, thus tending to reduce the strain on the axle due to its being loaded more or less toward its central point.

Having thus explained the nature of my invention and described an operative manner of constructing and using the same, although without attempting to set forth all of the forms in which it may be made, or all of the forms of its use, what I claim is:—

1. A traction wheel comprising a hub provided with annular flanges at its ends, a rim formed of spaced apart annular rings connected by transversely arranged cleats, spokes arranged in sets each connecting a flange of the hub with the correspondingly positioned rings of said rim, and pulling rods connected at their outer ends with said rings, their inner ends being attached to the hub in a line between the sets of spokes.

2. A traction wheel comprising a hub provided with annular flanges at its ends, a rim formed of spaced apart annular rings of angle iron having transverse tread portions connected by transversely arranged plates, and provided with flanges extending inwardly toward the hub, spokes arranged in sets each connecting a flange of the hub with the transverse flange of the correspondingly positioned ring of the rim, and pulling rods connected at their outer ends with the inwardly extending flanges of said rings, their inner ends being attached to the hub in a line between the sets of spokes.

3. A traction wheel comprising a hub provided with annular flanges at its ends, a rim formed of spaced apart annular rings connected by transversely arranged cleats, spokes arranged in sets, each connecting a flange of the hub with the correspondingly positioned rings of said rim, and pulling rods connected at their outer ends with said rings, their inner ends being attached to the hub in a line between the spokes, the outer ends of alternate pull rods being connected to opposite rings of said rim.

4. A traction wheel comprising a hub provided with annular flanges at its ends, a rim formed of spaced apart annular rings of angle iron having transverse tread portions connected by transversely arranged plates, and provided with flanges extending inwardly toward the hub, spokes arranged in sets each connecting a flange of the hub with the transverse flange of the correspondingly positioned ring of the rim, and pulling rods having loop portions at their outer ends attached to the inner faces of the inwardly extended flanges, the inner ends of said rods being attached to the hub in a line between the sets of spokes.

In testimony whereof I have hereunto set my hand in presence of two subscribing witnesses.

RUDOLPH B. MORTON.

Witnesses:
Wm. S. Hodges.
Chas. E. Riordon.